US010657900B2

(12) United States Patent
Jin et al.

(10) Patent No.: US 10,657,900 B2
(45) Date of Patent: May 19, 2020

(54) PIXEL DRIVING CIRCUIT, DRIVING METHOD THEREOF AND OLED DISPLAY PANEL

(71) Applicant: Shenzhen China Star Optoelectronics Semiconductor Display Technology Co., Ltd., Shenzhen (CN)

(72) Inventors: Yufeng Jin, Shenzhen (CN); Shen-sian Syu, Shenzhen (CN); Ming-jong Jou, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 38 days.

(21) Appl. No.: 15/576,409

(22) PCT Filed: Oct. 20, 2017

(86) PCT No.: PCT/CN2017/107123
§ 371 (c)(1),
(2) Date: Sep. 28, 2018

(87) PCT Pub. No.: WO2019/056444
PCT Pub. Date: Mar. 28, 2019

(65) Prior Publication Data
US 2019/0385531 A1 Dec. 19, 2019

(30) Foreign Application Priority Data
Sep. 22, 2017 (CN) .......................... 2017 1 0870156

(51) Int. Cl.
*G06F 3/038* (2013.01)
*G09G 5/00* (2006.01)
(Continued)

(52) U.S. Cl.
CPC ......... *G09G 3/3266* (2013.01); *G09G 3/3225* (2013.01); *G09G 3/3275* (2013.01)

(58) Field of Classification Search
CPC .. G09G 3/3208; G09G 3/3225; G09G 3/3266; G09G 3/3275
See application file for complete search history.

(56) References Cited

U.S. PATENT DOCUMENTS 7,928,935 B2 4/2011 Kanda
8,339,337 B2 12/2012 Yamashita et al.
(Continued)

FOREIGN PATENT DOCUMENTS

CN 1632853 A 6/2005
CN 102842283 A 12/2012

*Primary Examiner* — Insa Sadio
(74) *Attorney, Agent, or Firm* — Brinks Gilson & Lione

(57) ABSTRACT

A pixel driving circuit, a driving method thereof and an OLED display panel are provided. A plurality of scanning lines and a plurality of data lines of the pixel driving circuit intersect to define a plurality of pixel units, the plurality of pixel units in each row are connected to a corresponding scanning line and a corresponding power line, the plurality of pixel units in each column are connected to a corresponding data line, in a scanning period, scanning signal is input to an end of the scanning line to drive the plurality of pixel units along a first direction, power driving signal is input to an end of the power line opposite to the end of the scanning line to which the scanning signal is input to drive the plurality of pixel units along a second direction, the first direction and the second direction are opposite.

15 Claims, 4 Drawing Sheets

(51) Int. Cl.

| | |
|---|---|
| ***G09G 3/3266*** | (2016.01) |
| ***G09G 3/3225*** | (2016.01) |
| ***G09G 3/3275*** | (2016.01) |

(56) References Cited

U.S. PATENT DOCUMENTS

| | | | | |
|---|---|---|---|---|
| 8,350,839 | B2 | 1/2013 | Ozaki | |
| 9,293,519 | B2 | 3/2016 | Kwon et al. | |
| 2003/0020413 | A1* | 1/2003 | Oomura | G09G 3/3241 315/169.3 |
| 2004/0227706 | A1 | 11/2004 | Sung | |
| 2005/0057459 | A1 | 3/2005 | Miyazawa | |
| 2005/0242743 | A1 | 3/2005 | Kwak | |
| 2006/0028408 | A1 | 2/2006 | Kim | |
| 2010/0066714 | A1 | 3/2010 | Ozaki | |
| 2011/0115839 | A1* | 5/2011 | Takahashi | H01L 27/1225 345/698 |
| 2012/0287092 | A1 | 11/2012 | Tatara et al. | |
| 2014/0043219 | A1 | 2/2014 | Ota | |

* cited by examiner

PIXEL DRIVING CIRCUIT, DRIVING METHOD THEREOF AND OLED DISPLAY PANEL

CROSS-REFERENCE TO RELATED APPLICATIONS

The present application is a 35 U.S.C. § 371 National Phase conversion of International (PCT) Patent Application No. PCT/CN2017/107123 filed Oct. 20, 2017, which claims foreign priority of Chinese Patent Application No. 201710870156.9, filed on Sep. 22, 2017 in the State Intellectual Property Office of China, the entire contents of all of which are hereby incorporated by reference.

TECHNICAL FIELD

The present disclosure generally relates to display technology, and in particular relates to a pixel driving circuit, an OLED display panel and a driving method of the pixel driving circuit.

BACKGROUND

Owing to the advantageous of being capable of self-luminous and having large viewing angle, the organic Light-Emitting Diode (OLED) display panel has now been widely used. An OLED display panel is typically composed of a plurality of pixel units arranged in a matrix, the plurality pixel units display image data information under the driving of scanning signal and power driving signal.

During the long term development, the inventors of the present application have found that at present, the signal intensity would be weakened with the transmission path increases because of the loss of the signal in transmission, which would lead to a difference in the intensity of the scanning signal or the power driving signal received by the plurality of pixel units connected to a same scanning line or a same power line, thereby resulting in that the display luminance of the plurality of pixel units is different, and that the OLED display panel has a problem of uneven display.

SUMMARY

A principal technical problem to be addressed by the disclosure is to provide a pixel driving circuit, an OLED display panel and a pixel driving method, which could improve the display uniformity of the OLED display panel.

In order to resolve the technical problem mentioned above, a technical scheme adopted by the present disclosure is to provide a pixel driving method configured to drive a pixel driving circuit to work, wherein the pixel driving circuit comprises a plurality of scanning lines, a plurality of data lines, a plurality of power lines and a data driving chip, the plurality of scanning lines and the plurality of data lines intersect to define a plurality of pixel units, the plurality of pixel units in each row are connected to a corresponding scanning line and a corresponding power line, the plurality of pixel units in each column are connected to a corresponding data line, ends of the plurality of data lines close to the data driving chip being connected to the data driving chip, the pixel driving method includes: in a scanning period, inputting scanning signal to an end of the scanning line to drive the plurality of pixel units along a first direction, and inputting power driving signal to an end of the power line opposite to the end of the scanning line to which the scanning signal is input to drive the plurality of pixel units along a second direction, wherein the first direction and the second direction are opposite; and providing image signal for the plurality of data lines by the data driving chip.

In order to resolve the technical problem mentioned above, another technical scheme adopted by the present disclosure is to provide a pixel driving circuit, wherein the pixel driving circuit includes a plurality of scanning lines, a plurality of data lines and a plurality of power lines, the plurality of scanning lines and the plurality of data lines intersect to define a plurality of pixel units, the plurality of pixel units in each row are connected to a corresponding scanning line and a corresponding power line, the plurality of pixel units in each column are connected to a corresponding data line, in a scanning period, scanning signal is input to an end of the scanning line to drive the plurality of pixel units along a first direction, power driving signal is input to an end of the power line opposite to the end of the scanning line to which the scanning signal is input to drive the plurality of pixel units along a second direction, the first direction and the second direction are opposite.

In order to resolve the technical problem mentioned above, another technical scheme adopted by the present disclosure is to provide an OLED display panel including the pixel driving circuit mentioned above.

Compared with the prior art, the pixel circuit of the present disclosure includes a pixel driving circuit, the pixel driving circuit includes a plurality of scanning lines, a plurality of data lines and a plurality of power lines, the plurality of scanning lines and the plurality of data lines intersect to define a plurality of pixel units, the plurality of pixel units in each row are connected to a corresponding scanning line and a corresponding power line, the plurality of pixel units in each column are connected to a corresponding data line, in a scanning period, scanning signal is input to an end of the scanning line to drive the plurality of pixel units along a first direction, power driving signal is input to an end of the power line opposite to the end of the scanning line to which the scanning signal is input to drive the plurality of pixel units along a second direction, the first direction and the second direction are opposite, in this way, the pixel driving circuit of the present disclosure provides the scanning signal and the power driving signal transmitted along two directions opposite to each other for the pixel units in each row, such that the intensity attenuation direction of the scanning signal is opposite to the intensity attenuation direction of the power driving signal. The difference of the signal intensity obtained by the plurality of pixel units in a same row could be obviously reduced through the complementation of the two signals, thereby reducing the brightness difference of the plurality of pixel units in the same row and improving the display uniformity of the OLED display panel.

DETAILED DESCRIPTION

Figure 1:
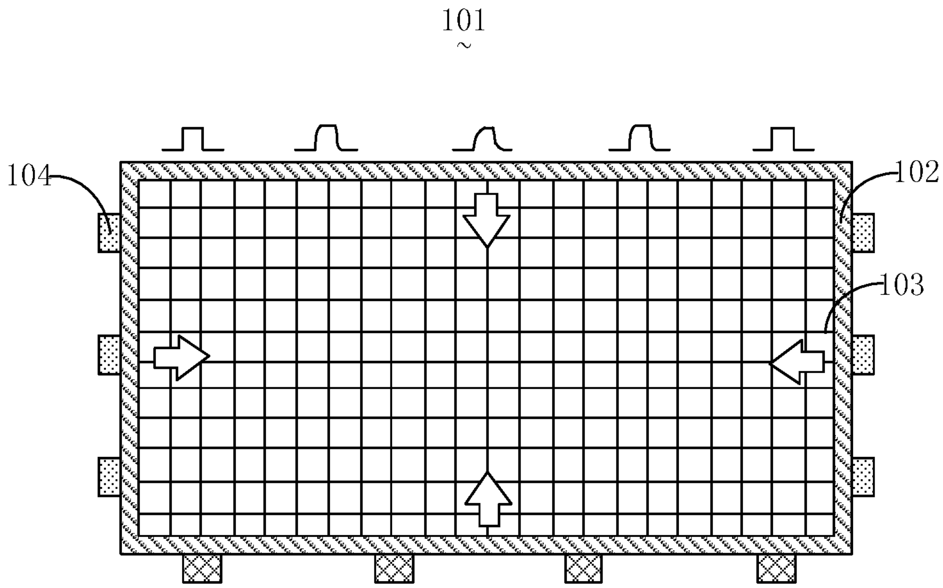
FIG. 1 is a schematic diagram of a driving circuit of a traditional OLED display panel.

Referring to FIG. 1, a driving circuit 101 of a traditional OLED display panel supplies power source to each pixel unit (not labeled) via power network (not labeled). The power network includes a power bus 102 in surroundings and power lines 103 connected to each pixel unit, the power lines 103 are also connected to the power bus 102, and obtain power driving signal from the power bus 102 to drive the pixel units to work. When the power network supplies the power driving signal to the pixel units, the power driving signal drives the pixel units sequentially along the power line 103 from the power bus 102 around pixel units area to the middle of the pixel units area. However, the power driving signal would be lost during the transmission in the power bus 102, and the loss would increase with the increase of transmission distance, which would lead to the intensity of the power driving signal obtained by the pixel units in the surrounding area being greater than that obtained by the pixel units in the middle area, thereby resulting in that the display brightness of the surrounding area of the OLED display panel is greater than that of the middle area. When scanning driving chips 104 arranged at relative sides of the pixel units area supply scanning signal to the pixel units in each row, the intensity of the scanning signal would be reduced with the increase of transmission distance, which would also lead to the display brightness of the relative sides of the OLED display panel being greater than that of the middle area. The problem above would affect the display uniformity of the OLED display panel badly. For example, the power driving signal is input to the pixel units from the surrounding area of the pixel units area, the display brightness of the surrounding area of the OLED display panel is greater than that of the middle area and the brightness difference is A. The scanning signal is input to the pixel units from two relative sides of the pixel units area, the display brightness of the two relative sides of the OLED display panel is greater than that of the middle area and the brightness difference is B, the total display brightness difference of the OLED display panel is A+B, resulting in that the brightness in the middle area of the OLED display panel is much lower than that in the surrounding area of the OLED display panel.

Figure 2:
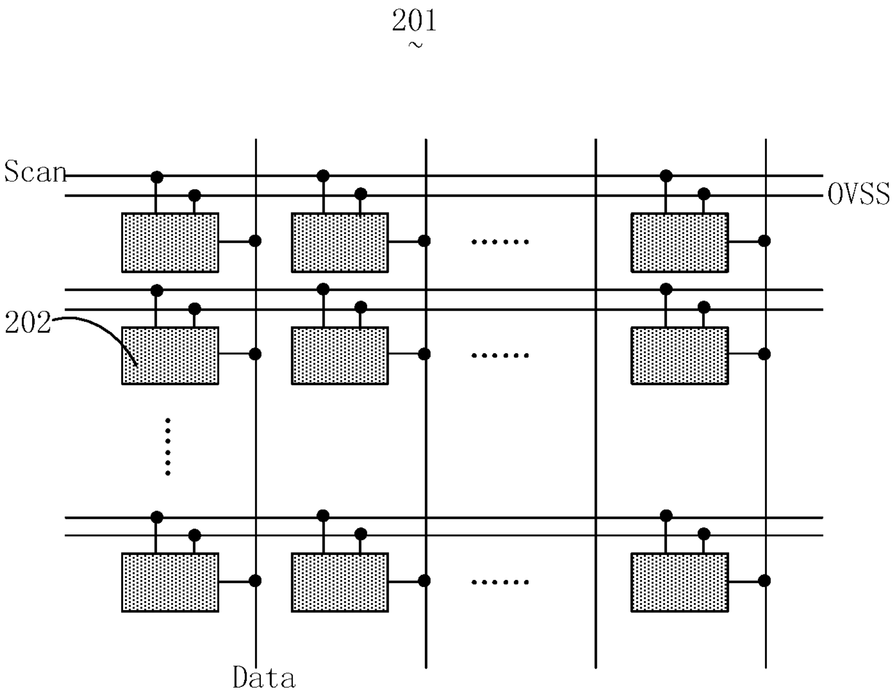
FIG. 2 is a schematic diagram of a pixel driving circuit according to a first embodiment of the present disclosure.

In view of the technical problem above, the present disclosure provides a pixel driving circuit, as shown in FIG. 2, a schematic diagram of a pixel driving circuit according to a first embodiment of the present disclosure is depicted. A pixel driving circuit 201 of the present embodiment may include a plurality of scanning lines Scan, a plurality of data lines Data and a plurality of power lines OVSS, the plurality of scanning lines Scan and the plurality of data lines Data may intersect to define a plurality of pixel units 202. The pixel units 202 in each row are connected to a corresponding scanning line Scan and a corresponding power line OVSS respectively, the pixel units 202 in each column are connected to a corresponding data line Data. In a scanning period, scanning signal may be input to an end of the scanning line Scan to drive the plurality of pixel units 202 along a first direction, power driving signal is input to an end of the power line OVSS opposite to the end of the scanning line to which the scanning signal is input to drive the plurality of pixel units 202 along a second direction, the first direction may be opposite to the second direction.

During the scanning period, the pixel driving circuit 201 of this embodiment provides the scanning signal for the pixel units 202 in each row along the first direction and provides the power driving signal for the pixel units 202 in each row along the second direction opposite to the first direction, such that the intensity attenuation direction of the scanning signal is opposite to the intensity attenuation direction of the power driving signal and the difference of the signal intensity obtained by the plurality of pixel units 202 in a same row could be obviously reduced through the complementation of the two signals.

Figure 3:
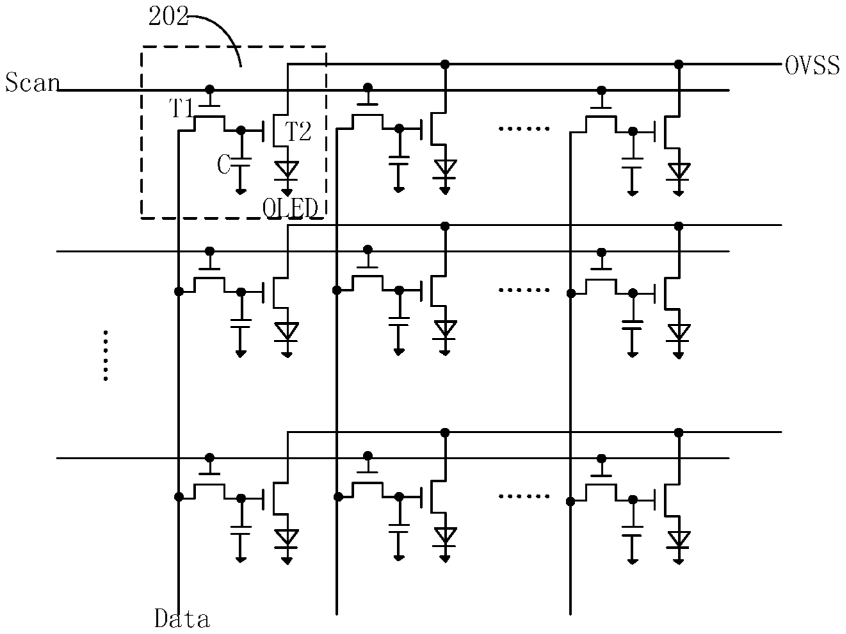
FIG. 3 is a schematic diagram of specific circuit of the pixel driving circuit shown in FIG. 2.

In this embodiment, as shown in FIG. 3, one pixel unit 202 of this embodiment may include an OLED, a first switch T1, a second switch T2 and a charging capacitor C. A controlling end of the first switch T1 may be connected to the scanning line Scan, a first communication end of the first switch T1 may be connected to the data line Data, while a second communication end of the first switch T1 may be connected to a first end of the charging capacitor C and a controlling end of the second switch T2 respectively. A second end of the charging capacitor C may be connected to the ground. A first communication end of the second switch T2 may be connected to the power line OVSS, a second communication end of the second switch T2 may be connected to the anode of the OLED, while the cathode of the OLED may be connected to the ground. When the scanning signal of the scanning line Scan is in a high level, the first switch T1 may be switched on, the data signal of the data line Data would charge the charging capacitor C as the first switch T1 is switched on. When the voltage of the charging capacitor C reaches the turn-on voltage of the second switch T2, the second switch T2 may be switched on. When the second switch T2 is switched on, the power driving signal of the power line OVSS may be input to the anode of OLED to drive the OLED to emit light.

It can be understood that the pixel unit 202 in other embodiments may adopt other circuit to replace the circuit shown in FIG. 3, such as, 7T1C, 5T2C, etc., the details are not limited in the present disclosure.

Compared with the prior art, the pixel driving circuit 201 of this embodiment provides the scanning signal and the power driving signal transmitted along two directions opposite to each other for the pixel units 202 in each row, such that the intensity attenuation direction of the scanning signal is opposite to the intensity attenuation direction of the power driving signal. The difference of the signal intensity obtained by the plurality of pixel units 202 in a same row could be obviously reduced through the complementation of the two signals, thereby reducing the brightness difference of the plurality of pixel units in the same row improving display uniformity of OLED display panel.

The present disclosure further provides a pixel driving circuit according to a second embodiment, the pixel driving circuit of this embodiment is illustrated base on the pixel driving circuit mentioned above. Please referring to FIG. 4, a schematic diagram of a pixel driving circuit according to a third embodiment of the present disclosure is depicted. The pixel driving circuit 401 of this embodiment may further include a first scanning chip 402 arranged at one side of the plurality of pixel units 404 and a first power bus 403 arranged at the opposite side of the plurality of pixel units 404. Ends of the plurality of scanning lines Scan close to the first scanning chip 402 may be connected to the first scanning chip 402, and the first scanning chip 402 may supply the scanning signal to the plurality of scanning lines Scan.

Ends of the plurality of power lines OVSS close to the first power bus 403 may be connected to the first power bus 403, and the first power bus 403 may supply the power driving signal to the plurality of power lines OVSS. The arrangement of this embodiment not only can ensure that the direction of the scanning signal is opposite to that of the power driving signal, but also can simplify the structure of the pixel driving circuit. In a scanning period, the first scanning chip 402 of this embodiment may provide the scanning signal to drive the plurality of pixel units 404 along the first direction, the first power bus 403 may provide the power driving signal to drive the plurality of pixel units 404 along the second direction, the first direction is opposite to the second direction, which could make the intensity attenuation direction of the scanning signal opposite to the intensity attenuation direction of the power driving signal. The difference of the signal intensity obtained by the plurality of pixel units 404 in a same row could be obviously reduced through the complementation of the two signals, thereby improving display uniformity of OLED display panel. Furthermore, compared to the traditional pixel driving circuit shown in FIG. 1, the pixel driving circuit 401 of this embodiment could reduce the number of the power bus 403 and save costs.

It could be understood that, in other embodiments, ends of the plurality of scanning lines Scan close to the first scanning chip 402 may be connected to the first scanning driving chip 402, and ends of the plurality of power lines OVSS close to the first power bus 403 may be connected to the first power bus 403.

Figure 5:
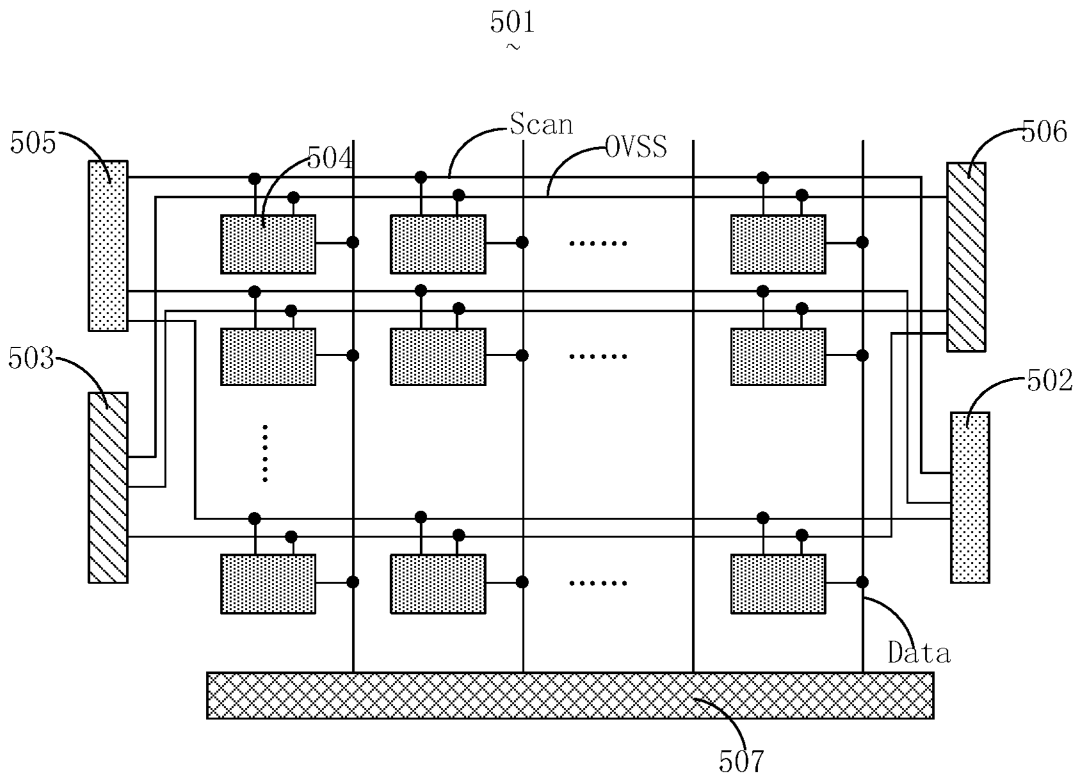
FIG. 5 is a schematic diagram of a pixel driving circuit according to a third embodiment of the present disclosure.

The present disclosure further provides a pixel driving circuit according to a third embodiment, the pixel driving circuit of this embodiment is illustrated based on the pixel driving circuit mentioned above. Referring to FIG. 5, a schematic diagram of a pixel driving circuit according to a third embodiment of the present disclosure is depicted. The pixel driving circuit 501 of this embodiment may further include a second scanning chip 502 arranged at the same side as the first power bus 506 and a second power bus 503 arranged at the same side as the first scanning chip 505. Ends of the plurality of scanning lines Scan close to the first scanning driving chip 505 may be connected to the first scanning driving chip 505, the other ends of the plurality of scanning lines Scan may be connected to the second scanning driving chip 502. The first scanning driving chip 505 and the second scanning driving chip 502 may supply the scanning signal to the plurality of scanning lines Scan. Ends of the plurality of power lines OVSS close to the first power bus 506 may be connected to the first power bus 506, the other ends of the plurality of the power lines OVSS may be connected to the second power bus 503. The first power bus 506 and the second power bus 503 may supply the power driving signal to the plurality of power lines OVSS.

Figure 6:
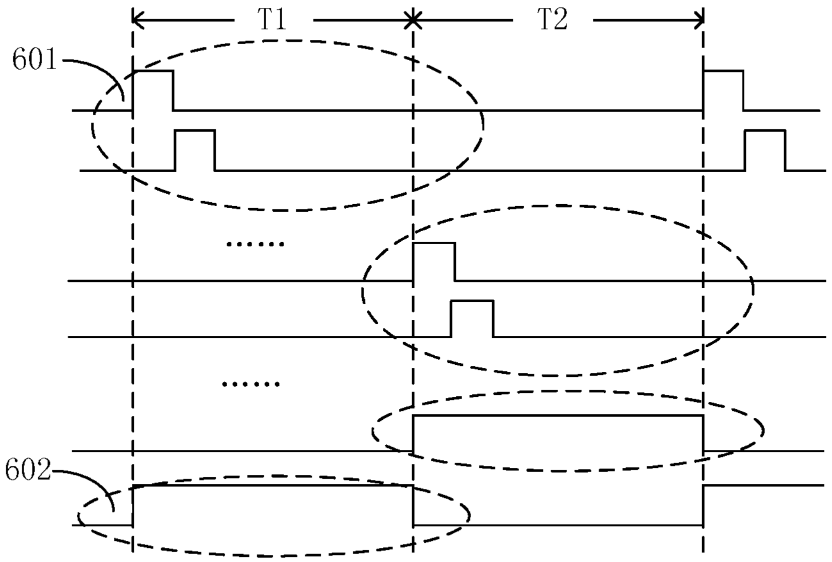
FIG. 6 is a waveform diagram of the scanning signal and the power driving signal of the pixel driving circuit shown in FIG. 5.

Referring to FIG. 6, in a current scanning period T1, the first scanning driving chip 505 of the this embodiment may provide the scanning signal 601 for the plurality of scan lines Scan to drive the plurality of pixel units 504 along the first direction, while the first power bus 506 may provide the power driving signal 602 for the plurality of power lines OVSS to drive the plurality of pixel units 504 along the second direction. In the next scanning period T2, the second scanning driving chip 502 may provide the scanning signal 601 for the plurality of scanning lines Scan to drive the plurality of pixel units 504 along the second direction, while the second power bus 503 may provide the power driving signal 602 for the plurality of power lines OVSS to drive the plurality of pixel units 504 along the first direction. Therefore, in the same period, the transmission direction of the scanning signal 601 and the power driving signal 602 are opposite, which could reduce the brightness difference of the plurality of pixel units 504 in the same row, thereby improving the display uniformity of OLED display panel.

Furthermore, the pixel driving circuit mentioned above may further include a data driving chip providing image data signal for the pixel units. Specifically, as shown in FIG. 5, the pixel driving circuit 501 may further include a data driving chip 507 arranged at one side of the plurality of pixel units 504, specifically at the side without the first scanning driving chip 505, the second scanning driving chip 502, the first power driving bus 506 and the second power driving bus 503. Ends of the plurality of data lines Data close to the data driving chip 507 may be connected to the data driving chip 507, in this way, the structure of the pixel driving circuit may be simplify. The data driving chip 507 may provide the data signal for the plurality of data lines Data.

In other embodiments, a first data driving chip may be arranged at the position of the data driving chip 507 and a second data driving chip may be arranged relatively to the first data driving chip. The first data driving chip and the second data driving chip may be connected to a plurality of first data lines and second data lines respectively, the first data lines may be connected to the pixel units near the first data driving chip, and supply the data signal to the pixel units. The second data lines may be connected to the pixel units near the second data driving chip, and supply the data signal to the pixel units. In this way, the data transmission paths of the data signal and the data signal loss could be reduced, thereby improving the display uniformity of OLED display panel.

In the embodiment above, the number of the first scanning driving chip 505, the second scanning driving chip 502, the data driving chip 506, the first data driving chip and the second data driving chip may be one or at least two, the details are not limited herein.

Figure 7:
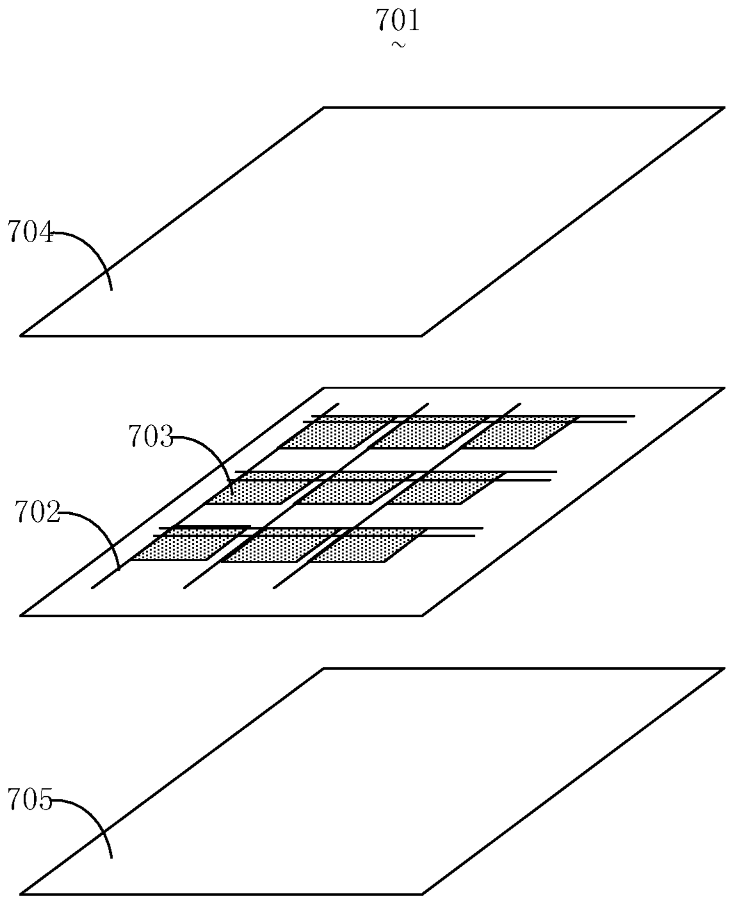
FIG. 7 is a schematic diagram of an OLED display panel according to an embodiment of the present disclosure.

The present disclosure further provides an OLED display panel, referring to FIG. 7, the OLED display panel 701 may include a pixel driving circuit 702 and a plurality of pixel units 703, the structure and work principle of the pixel driving circuit 702 are illustrated in the embodiments above, which are not recited herein. The OLED display panel 701 of this embodiment further include an upper substrate 704 arranged at one side of the pixel driving circuit 702 and the plurality of pixel units 703, and a lower substrate 703 arranged at the other side of the pixel driving circuit 702 and the plurality of pixel units 703.

Compared with the prior art, the OLED display panel 701 of this embodiment could improve the display uniformity.

The present disclosure further provides a pixel driving method configured to drive the pixel driving circuit 201 to work. The structure of the pixel driving circuit 201 is shown in FIG. 2. The pixel driving circuit 201 of the present disclosure may include a plurality of scanning lines Scan, a plurality of data lines Data and a plurality of power lines OVSS, the plurality of scanning lines Scan and the plurality of data lines Data may intersect to define a plurality of pixel units 202. The plurality of pixel units 202 in each row may be connected to a corresponding scanning line Scan and a corresponding power line OVSS respectively, and the plurality of pixel units 202 in each column may be connected to a corresponding data line Data. The pixel driving method of this embodiment may include:

In a scanning period, inputting scanning signal for the pixel units 202 in each row along a first direction, and inputting power driving signal for the pixel units 202 in each row along a second direction opposite to the first direction, such that the scanning signal may be decayed along the first direction, while the power driving signal may be decayed along the second direction, which may make the difference of the signal strength obtained by the plurality of pixel units 202 in the same row be obviously reduced, thereby obviously reducing the display brightness of the plurality of pixel units 202 in the same row.

Figure 4:
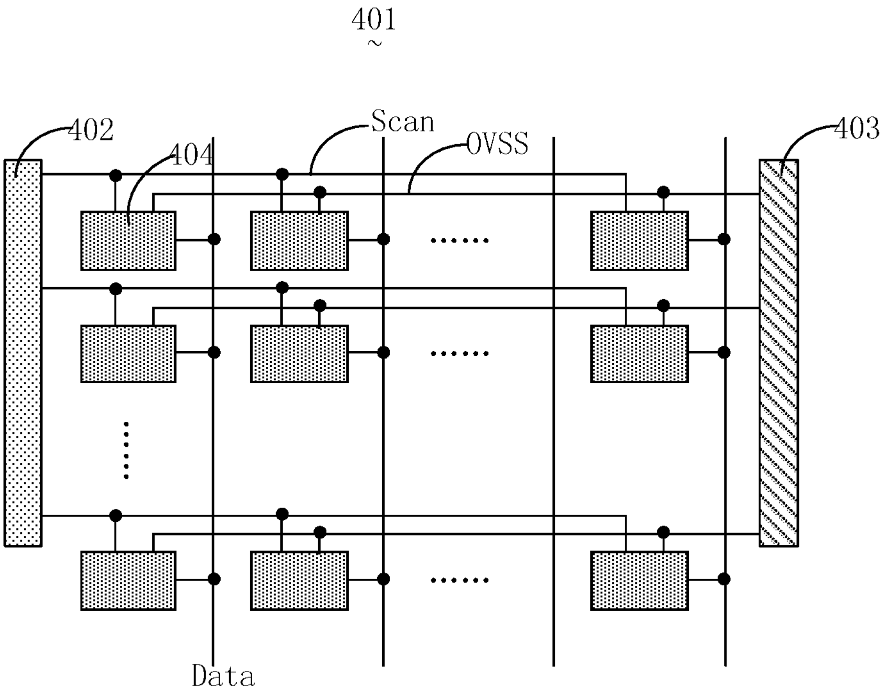
FIG. 4 is a schematic diagram of a pixel driving circuit according to a second embodiment of the present disclosure.

The present disclosure further provides a pixel driving method configured to drive the pixel driving circuit 401 to work according to a second embodiment. Referring to FIG. 4, the structure of the pixel driving circuit 401 is shown. The first scanning driving chip 402 may be arranged at one side of the plurality of pixel units 202 and the first power bus 403 may be arranged at the relative side of the plurality of pixel units 202, i.e. the first scanning driving chip 402 and the first power bus 403 may be arranged at the opposite sides of the pixel units area. Ends of the plurality of scanning lines Scan close to the first scanning chip 402 may be connected to the first scanning chip 402, and the first scanning chip 402 may supply the scanning signal to the plurality of scanning lines Scan. Ends of the plurality of power lines OVSS close to the first power bus 403 may be connected to the first power bus 403, and the first power bus 403 may supply the power driving signal to the plurality of power lines OVSS. The pixel driving method of this embodiment may include:

In a scanning period, providing the scanning signal to drive the plurality of pixel units 404 by the first scanning driving chip 402 along a first direction and providing the power driving signal to drive the plurality of pixel units 404 by the first power bus 403 along a second direction, the first direction and the second direction are opposite.

The present disclosure further provides a pixel driving method configured to drive the pixel driving circuit 501 to work according to a third embodiment. Referring to FIG. 5, the structure of the pixel driving circuit 501 is shown. The pixel driving circuit 501 of this embodiment may further include a second scanning chip 502 and a second power bus 503, the second scanning chip 502 may be arranged on the same side as the first power bus 506, while the second power bus 503 may be arranged on the same side as the first scanning chip 505. Ends of the plurality of scanning lines Scan close to the first scanning driving chip 505 may be connected to the first scanning driving chip 505, the other ends of the plurality of scanning lines Scan may be connected to the second scanning driving chip 502. The first scanning driving chip 505 and the second scanning driving chip 502 may supply the scanning signal to the plurality of scanning lines Scan. Ends of the plurality of power lines OVSS close to the first power bus 506 may be connected to the first power bus 506, the other ends of the plurality of power lines OVSS may be connected to the second power bus 503. The first power bus 506 and the second power bus 503 may supply the power driving signal to the plurality of power lines OVSS. The pixel driving method of this embodiment may include:

In a current scanning period T1, providing the scanning signal 601 for the plurality of scanning lines Scan to drive the plurality of pixel units 504 along the first direction by the first scanning chip 505 (as shown in FIG. 6), and providing the power driving signal 602 for the plurality of power lines OVSS to drive the plurality of pixel units 504 along the second direction by the first power bus 506; in the next period, providing the scanning signal 601 for the plurality of scanning lines Scan to drive the plurality of pixel units 504 along the second direction by the second scanning chip 502, and providing the power driving signal 602 for the plurality of power lines OVSS to drive the plurality of pixel units 504 along the first direction by the second power bus 503.

The pixel driving method of this embodiment could provide the scanning signal and the power signal transmitted in two opposite directions for the pixel units in each row, which could make the intensity attenuation direction of the scanning signal be opposite to the intensity attenuation direction of the power driving signal. The difference of the signal intensity obtained by the plurality of pixel units 202 of a same row could be obviously reduced through the complementation of the two signals, thereby reducing the difference of brightness of the plurality of pixel units in the same row and improving display uniformity of OLED display panel.

Furthermore, the pixel driving circuit of the embodiment above may further include a data driving chip 507, the data driving chip 507 may be connected to the plurality of data lines Data. The pixel driving method may further include providing image data signal for the pixel units via the data lines Data by the data driving chip 507.

The above description depicts merely some exemplary embodiments of the disclosure, but is meant to limit the scope of the disclosure. Any equivalent structure or flow transformations made to the disclosure, or any direct or indirect applications of the disclosure on other related fields, shall all be covered within the protection of the disclosure.

What is claimed is:

1. A pixel driving method, configured to drive a pixel driving circuit, the pixel driving circuit comprising a plurality of scanning lines, a plurality of data lines, a plurality of power lines and a data driving chip, the plurality of scanning lines and the plurality of data lines intersecting to define a plurality of pixel units, the plurality of pixel units in each row being connected to a corresponding scanning line and a corresponding power line, the plurality of pixel units in each column being connected to a corresponding data line, ends of the plurality of data lines close to the data driving chip being connected to the data driving chip, wherein the pixel driving method comprising:

in a scanning period, inputting scanning signal to an end of the scanning line to drive the plurality of pixel units along a first direction, and inputting power driving signal to an end of the power line opposite to the end of the scanning line to which the scanning signal is input to drive the plurality of pixel units along a second direction, wherein the first direction and the second direction are opposite; and providing image data signal for the plurality of data lines by the data driving chip.

2. The pixel driving method according to claim 1, wherein the pixel driving circuit further comprises a first scanning driving chip arranged at one side of the plurality of pixel units and a first power bus arranged at the opposite side of the plurality of pixel units, wherein ends of the plurality of scanning lines close to the first scanning driving chip are connected to the first scanning driving chip; wherein ends of the plurality of power lines close to the first power bus are connected to the first power bus, the pixel driving method comprises:

providing the scanning signal to drive the plurality of pixel units along the first direction by the first scanning driving chip and providing the power driving signal to drive the plurality of pixel units along the second direction by the first power bus in a scanning period.

3. The pixel driving method according to claim 2, wherein the pixel driving circuit further comprises a second scanning driving chip arranged at the same side as the first power bus and a second power bus arranged at the same side as the first scanning driving chip; the other ends of the plurality of scanning lines are connected to the second scanning driving chip; the other ends of the plurality of power lines are connected to the second power bus, wherein the pixel driving method comprises:

providing the scanning signal for the plurality of scanning lines to drive the plurality of pixel units along the first direction by the first scanning driving chip, providing the power driving signal for the plurality of power lines to drive the plurality of pixel units along the second direction by the first power bus in a current scanning period; and providing the scanning signal for the plurality of scanning lines to drive the plurality of pixel units along the second direction by the second scanning driving chip, providing the power driving signal for the plurality of power lines to drive the plurality of pixel units along the first direction by the second power bus in a next scanning period.

4. A pixel driving circuit, comprising a plurality of scanning lines, a plurality of data lines and a plurality of power lines, the plurality of scanning lines and the plurality of data lines intersecting to define a plurality of pixel units, the plurality of pixel units in each row being connected to a corresponding scanning line and a corresponding power line, the plurality of pixel units in each column being connected to a corresponding data line, wherein in a scanning period, scanning signal is input to an end of the scanning line to drive the plurality of pixel units along a first direction, wherein power driving signal is input to an end of the power line opposite to the end of the scanning line to which the scanning signal is input to drive the plurality of pixel units along a second direction, wherein the first direction and the second direction are opposite.

5. The pixel driving circuit according to claim 4, further comprising a first scanning driving chip arranged at one side of the plurality of pixel units and a first power bus arranged at the opposite side of the plurality of pixel units, wherein ends of the plurality of scanning lines close to the first scanning driving chip are connected to the first scanning driving chip and the first scanning driving chip provides the scanning signal for the plurality of scanning lines; wherein ends of the plurality of power lines close to the first power bus are connected to the first power bus and the first power bus provides the power driving signal for the plurality of power lines, the scanning signal drives the plurality of pixel units along the first direction and the power driving signal drives the plurality of pixel units along the second direction opposite to the first direction.

6. The pixel driving circuit according to claim 5, wherein in a scanning period, the scanning signal provided by the first scanning chip drives the plurality of pixel units along the first direction, and the power driving signal provided by the first power bus drives the plurality of pixel units along the second direction.

7. The pixel driving circuit according to claim 5, further comprising a second scanning driving chip arranged at the same side as the first power bus and a second power bus arranged at the same side as the first scanning driving chip;

wherein the other ends of the plurality of scanning lines are connected to the second scanning driving chip, the second scanning driving chip provides the scanning signal for the plurality of scanning lines;

the other ends of the plurality of power lines are connected to the second power bus, the second power bus provides the power driving signal for the plurality of power lines, the scanning signal provided by the second scanning driving chip drives the plurality of pixel units along the second direction and the power driving signal provided by the second power bus drives the plurality of pixel units along the first direction opposite to the second direction.

8. The pixel driving circuit according to claim 7, wherein in a current period, the first scanning driving chip provides the scanning signal for the plurality of scanning lines to drive the plurality of pixel units along the first direction, the first power bus provides the power driving signal for the plurality of power lines to drive the plurality of pixel units along the second direction; and in a next scanning period, the second scanning driving chip provides the scanning signal for the plurality of scanning lines to drive the plurality of pixel units along the second direction, and the second power bus provides the power driving signal for the plurality of power lines to drive the plurality of pixel units along the first direction.

9. The pixel driving circuit according to claim 5, further comprising a data driving chip arranged at one side of the plurality of pixel units; wherein ends of the plurality of data lines close to the data driving chip are connected to the data driving chip, and the data driving chip provides image signal for the plurality of data lines.

10. An OLED display panel, comprising a pixel driving circuit; wherein the pixel driving circuit comprises a plurality of scanning lines, a plurality of data lines and a plurality of power lines, the plurality of scanning lines and the plurality of data lines intersecting to define a plurality of pixel units, and the plurality of pixel units in each row being connected to a corresponding scanning line and a corresponding power line, the plurality of pixel units in each column being connected to a corresponding data line, wherein in a scanning period, scanning signal is input to an end of the scanning line to drive the plurality of pixel units along a first direction, power driving signal is input to an end of the power line opposite to the end of the scanning line to which the scanning signal is input to drive the plurality of pixel units along a second direction, wherein the first direction and the second direction are opposite.

11. The display panel according to claim 10, further comprising a first scanning driving chip arranged at one side of the plurality of pixel units and a first power bus arranged at the opposite side of the plurality of pixel units, wherein ends of the plurality of scanning lines close to the first scanning driving chip are connected to the first scanning driving chip and the first scanning driving chip provides the scanning signal for the plurality of scanning lines;

wherein ends of the plurality of power lines close to the first power bus are connected to the first power bus and the first power bus provides the power driving signal for the plurality of power lines, and the scanning signal drives the plurality of pixel units along the first direction and the power driving signal drives the plurality of pixel units along the second direction opposite to the first direction.

12. The display panel according to claim 11, wherein in a scanning period, the scanning signal provided by the first scanning chip drives the plurality of pixel units along the first direction, the power driving signal provided by the first power bus drives the plurality of pixel units along the second direction.

13. The display panel according to claim 11, further comprising a second scanning driving chip arranged at the same side as the first power bus and a second power bus arranged at the same side as the first scanning driving chip;

wherein the other ends of the plurality of scanning lines are connected to the second scanning driving chip, the second scanning driving chip provides the scanning signal for the plurality of scanning lines; the other ends of the plurality of power lines are connected to the second power bus, the second power bus provides the power driving signal for the plurality of power lines, the scanning signal provided by the second scanning driving chip drives the plurality of pixel units along the second direction and the power driving signal provided by the second power bus drives the plurality of pixel units along the first direction opposite to the second direction.

14. The display panel according to claim 13, wherein in a current period, the first scanning driving chip provides the scanning signal for the plurality of scanning lines to drive the plurality of pixel units along the first direction, the first power bus provides the power driving signal for the plurality of power lines to drive the plurality of pixel units along the second direction; and in a next scanning period, the second scanning driving chip provides the scanning signal for the plurality of scanning lines to drive the plurality of pixel units along the second direction, and the second power bus provides the power driving signal for the plurality of power lines to drive the plurality of pixel units along the first direction.

15. The display panel according to claim 11, wherein further comprising a data driving chip arranged at one side of the plurality of pixel units; wherein ends of the plurality of data lines close to the data driving chip are connected to the data driving chip, and the data driving chip provides image signal for the plurality of data lines.

* * * * *